(12) United States Patent
Aragon et al.

(10) Patent No.: US 8,203,986 B2
(45) Date of Patent: Jun. 19, 2012

(54) THROTTLING ACCESS POINTS

(75) Inventors: David Bradburn Aragon, Berkeley, CA (US); Matthew Stuart Gast, San Francisco, CA (US)

(73) Assignee: Trapeze Networks, Inc., Pleasanton, CA (US)

(*) Notice: Subject to any disclaimer, the term of this patent is extended or adjusted under 35 U.S.C. 154(b) by 586 days.

(21) Appl. No.: 12/365,891

(22) Filed: Feb. 4, 2009

(65) Prior Publication Data

US 2010/0195549 A1   Aug. 5, 2010

(51) Int. Cl.
  *G08C 17/00* (2006.01)
  *H04B 7/185* (2006.01)
  *H04M 1/00* (2006.01)
(52) U.S. Cl. ......... 370/311; 370/318; 455/522; 455/574
(58) Field of Classification Search .................. 370/252, 370/310–350; 455/522, 574
See application file for complete search history.

(56) References Cited

U.S. PATENT DOCUMENTS

| 6,006,101 | A  | * | 12/1999 | Sakamoto | 455/517 |
|---|---|---|---|---|---|
| 7,756,548 | B2 | * | 7/2010 | Laroia et al. | 455/561 |
| 2004/0259542 | A1 | * | 12/2004 | Viitamaki et al. | 455/426.2 |
| 2005/0154933 | A1 | * | 7/2005 | Hsu et al. | 713/320 |
| 2005/0190714 | A1 | * | 9/2005 | Gorbatov et al. | 370/318 |
| 2008/0117849 | A1 | * | 5/2008 | Borran et al. | 370/311 |
| 2010/0002610 | A1 | * | 1/2010 | Bowser et al. | 370/311 |
| 2010/0172276 | A1 | * | 7/2010 | Aragon | 370/311 |
| 2011/0105200 | A1 | * | 5/2011 | Tomita et al. | 455/574 |

OTHER PUBLICATIONS

Thomson, Allan; Green Sleep; Power Point slide show; IEEE standards committee meeting Jul. 15, 2008; pp. 1-20.
Co-pending U.S. Appl. No. 12/350,927, filed Jan. 8, 2009.

* cited by examiner

*Primary Examiner* — Warner Wong

(57) ABSTRACT

A technique for controlling the amount of power consumed by access points (APs) of a wireless network involves implementing throttleable APs (TAPs). It would be desirable for the TAPs to be in a relatively low power mode during periods of low activity, and switch to a high power mode in response to increased wireless activity. To that end, a throttling engine can be implemented to throttle TAPs up in power in response to increases in wireless activity, and throttle TAPs down in power in response to decreases in wireless activity.

15 Claims, 8 Drawing Sheets

THROTTLING ACCESS POINTS

BACKGROUND

Wireless access points (APs) consume power. Typically a wireless network includes many APs that are regularly on to ensure wireless service is available to stations accessing the wireless network.

An individual AP draws a moderate amount of power by itself, and many APs across a wireless network can collectively draw a large amount of power. Such APs may not be servicing clients and may be wasting power. In a business environment or on educational campus, hundreds or even thousands of APs can be used to provide wireless connectivity throughout the network. In similar environments significant amounts of power can be consumed.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for controlling power consumed by access points (APs) of a wireless domain involves implementing throttleable APs (TAPs). It would be desirable for the TAPs to be in a low power mode during periods of low activity, and high power mode during periods of high activity. To that end, a throttling engine or wireless domain power saving engine can throttle TAPs up in power in response to increases in wireless activity, and throttle TAPs down in power, or not throttle the TAPs up in power, in response to decreases in activity.

When there is no wireless activity, the TAPs can be in a sentry mode. However, it may be desirable to keep at least some of the TAPs' radios with fully enabled functionality. TAPs can be placed in such a way that they cover a designated hot spot. At some point, wireless activity may reach a wireless activity threshold level, and the throttling engine can throttle one or more of the TAPs up in power to help manage the wireless traffic.

A systems administrator can establish a wireless activity threshold based upon a wireless activity parameter. The wireless activity parameters can include radio frequency (RF) energy detected, duration of wireless activity, quality of service (QoS), or other values. For example, if client activity is largely voice, it may be desirable to have higher power APs to ensure that the voice quality is good, whereas it is not as critical if the client activity is largely data. The throttling engine can use the threshold to determine when to throttle TAPs up in power.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
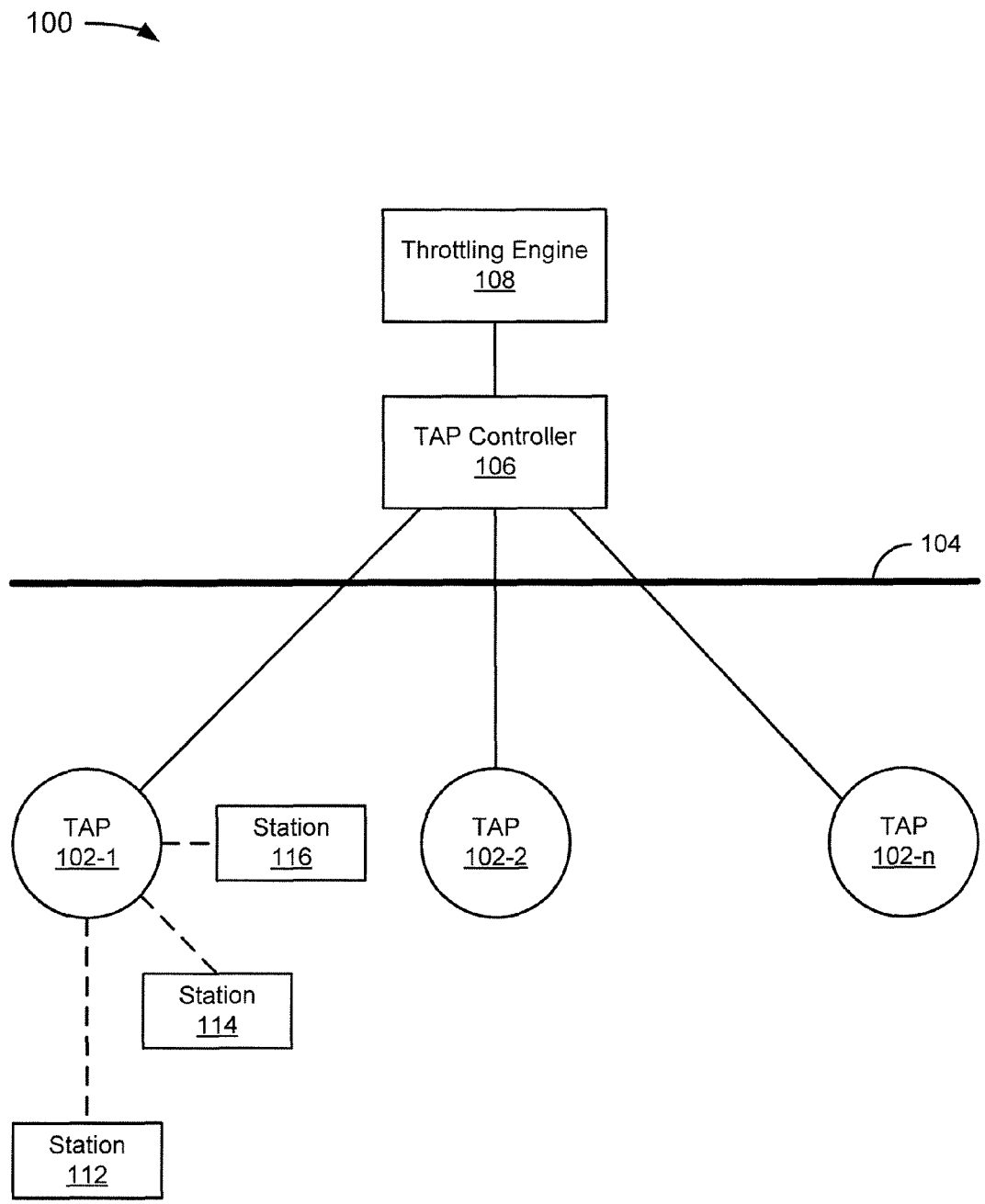
FIG. 1 depicts an example of a system for controlling power consumption of a wireless domain based on fluctuations in wireless station activity.

FIG. 1 depicts an example of a system 100 for controlling power consumption of a wireless domain based on fluctuations in wireless station activity. The system 100 includes a throttleable access point (TAP) 102-1 and TAPs 102-2 to 102-n (collectively, TAPs 102), a backbone network 104, a TAP controller 106, and a throttling engine 108. The system 100 consumes less power in a relatively low-power state and more power in a relatively high power state. For illustrative purposes, "low power" and "high power" refers to the amount of power consumed by the TAPs 102. It should be noted that the system 100 may or may not also include non-TAP APs (not shown).

In the example of FIG. 1, the TAPs 102 are access points (APs) that are, in normal operation, continuously on. This enables the TAPs 102 to communicate rapidly with wireless stations even when an AP with which a wireless station communicates is in a low-power state. A station, as used herein, may be referred to as a device with a media access control (MAC) address and a physical layer (PHY) interface to the wireless medium that comply with the IEEE 802.11 standard. As such, in a non-limiting embodiment, the TAPs 102, and APs in general, are stations. In alternative embodiments, a station may comply with a different standard than IEEE 802.11, may be referred to as something other than a "station," and may have different interfaces to a wireless or other medium. IEEE 802.11a-1999, IEEE 802.11b-1999, IEEE 802.11g-2003, IEEE 802.11-2007, and IEEE 802.11n TGn Draft 7.0 (2008) are incorporated by reference. As used in this paper, a system that is 802.11 standards-compatible or 802.11 standards-compliant complies with at least some of one or more of the incorporated documents' requirements and/or recommendations.

The number of TAPs 102 desirable for a given implementation can depend upon the desired size of a wireless domain. For example, it may be desirable to locate the TAPs 102 such that they cover the entire area/space of the wireless domain. The number of TAPs 102 desirable for a given implementation can also depend upon the desired capacity of a wireless domain. For example, it may be desirable to locate the TAPs 102 such that they can handle the amount of traffic that is expected in a particular area of the wireless domain. Thus, in one possible implementation, the TAPs 102 provide wireless coverage that is overlapping, perhaps with greater redundancy in areas where a certain amount of wireless traffic is anticipated. In areas where a TAP can be throttled up in power to meet expected demand, it may be deemed unnecessary to provide a redundant, overlapping TAP. In areas where there are redundant, overlapping TAPs, it may be desirable to turn off some of the TAPs, and only wake them up when active TAPs are unable to meet traffic demands or quality of service (QoS) requirements, which may or may not be configurable depending upon the implementation. An implementation of an AP, provided by way of example but not limitation, includes a TRAPEZE NETWORKS® MOBILITY POINT® (MP®) AP. An implementation of a wireless domain, provided by way of example but not limitation, includes a TRAPEZE NETWORKS® SMART MOBILE® (TRAPEZE SMART MOBILE®) wireless domain.

In operation, the TAPs 102 transmit and receive data (and may therefore be referred to as transceivers) using one or more radio transmitters. One or more of the TAPs 102 can have more than one associated radio, such as, by way of example but not limitation, a first radio configured for 5 GHz transmissions, and a second radio configured for 2.4 GHz transmissions. (Other bands are acceptable, too.) In a non-limiting embodiment, the TAPs 102 transmit and receive information as radio frequency (RF) signals to and from a wireless station over an Ethernet connection. The TAPs 102 can transmit and receive information to and from associated wireless exchange switches. Connection to a second wireless exchange switch provides redundancy. An implementation of a wireless exchange switch, provided by way of example but not limitation, includes a TRAPEZE NETWORKS® MOBILITY EXCHANGE® (MX®) switch.

Advantageously, the TAPs 102 are APs capable of being throttled to control power consumed by the TAPs 102. The granularity of the throttle is implementation- and/or configuration-specific, but presumably the amount of power above a minimum useful threshold and a maximum possible threshold could be set to practically any level, subject to practical considerations. For example, extraordinarily fine settings may cost more to implement than would be desirable for a person who only wants relatively fine settings.

For illustrative purposes, the following power settings are considered for the TAPs 102. 1) If an AP is powered down, it, of course, receives no power. 2) In a standby mode, a subset of the components of the AP receive power, presumably to enable the AP to power up more rapidly than from a powered-down state, to enable LEDs to indicate status, or for some other applicable reason. 3) As used in this paper, a minimum radio power setting for an AP is the lowest power setting at which radio functionality is at least partially enabled. For example, a minimum radio power setting can be, by way of example but not limitation, a sentry mode in which an AP is able to receive data via radio, but not transmit via radio. Although perhaps of dubious value in some implementations, a minimum radio power setting might enable transmission and not reception. It should be noted that in practice a transmitter typically consumes more power than a receiver of the transmitter, but that distinction is irrelevant to gaining an understanding of the techniques described in this paper. 4) As used in this paper, a low power setting for an AP is a power setting at which radio functionality is fully enabled for a single spatial stream. For example, a low power setting can be the lowest power setting at which an AP can both receive and transmit RF signals in accordance with an implemented standard. 5) As used in this paper, a high power setting for an AP is intended to mean a radio that is receiving sufficient power to support multiple spatial streams. The radio can be implemented as a multiple-input multiple-output (MIMO) device with multiple transmitter and receiver antennas. MIMO technology can enable spatial division multiplexing (SDM). SDM spatially multiplexes multiple independent data streams, transferred simultaneously within one spectral channel of bandwidth. Currently, each spatial stream requires an antenna at both the transmitter and the receiver. So, where SDM is used, a high power setting for an AP can mean that at least two antenna are enabled, and perhaps an RF chain and analog-to-digital converter for each antenna. A high power setting for an AP can also mean channel bonding is implemented, which can mean simultaneous transmission over multiple non-overlapping channels. For example, a 40 MHz mode of operation can use two adjacent 20 MHz bands. (While this doubles the throughput on the physical layer, MAC and user level throughput will not double.) A high power setting for an AP can mean both MIMO and channel bonding, which is supported by the IEEE 802.11n (draft) standard, for example. 6) As used in this paper, a maximum radio power setting for an AP is intended to mean a radio that is using multiple spatial streams at maximum power. 7) As used in this paper, a relatively low power setting can have a variable associated power, but will typically be referred to in contrast to a relatively high power setting. As such, a relatively low power setting is between a minimum radio power setting (inclusive) and a relatively high power setting (exclusive); and the relatively high power setting is between the relatively low power setting (exclusive) and the maximum radio power setting (inclusive). On the other hand, when making reference to a wireless domain, relatively low power can mean the aggregated power consumption of TAPs 102 is lower than at a relatively high power. Examples of TAPs are discussed in further detail later.

In a non-limiting embodiment, the TAPs 102 are hardware units that act as a communication hub by linking wireless stations to the backbone network 104. This can enable, the TAPs 102 to connect users to other users within the network and/or to serve as the point of interconnection between a WLAN and a wired network. The connection to the backbone network 104 is sometimes referred to as a "link." The APs act as generally transparent bridges connecting wireless stations to the backbone network 104. In 802.11 standards-compliant and some other implementations, the backbone network 104 is an Ethernet network, but this is not mandatory for all implementations. In some implementations, the backbone network 104 is a wired backbone network, though the backbone network 104 could conceivably be implemented as a wireless backbone (presumably coupled to a wired network at some point). In a typical implementation, the backbone network 104 couples the TAPs 102 to network resources (not shown). Where the backbone network 104 is implemented as an 802.11-compatible system, the backbone network 104 is typically connected to the outside world through what is typically referred to as a portal (not shown).

In the example of FIG. 1, the TAP controller 106 is coupled to the backbone network 104. The TAP controller 106 can include practically any type of device that is capable of communicating with a communications network, such as, by way of example but not limitation, a server class computing system or a workstation. The TAP controller 106 can be distributed or centrally located. The TAP controller 106 can include a single controller for all of the TAPs 102; multiple controllers, one for each of the TAPs 102; or some arbitrary or convenient number of controllers, each for controlling a subset of the TAPs 102. In some implementations, the TAP controller 106 controls a "dumb" AP, while in other implementations, functionality of the TAP controller 106 can be implemented in whole or in part in a "smart" AP. The TAP controller 106 may or may not include a wireless switch. In some implementations, the TAP controller 106 is aware of associations of stations to APs of the system 100. In operation, controllers are engines implemented in special purpose hardware, firmware, or software embodied in a computer readable medium for execution by a processor.

In the example of FIG. 1, the TAP controller 106 is coupled to the throttling engine 108. As used in this paper, an engine includes a processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The throttling engine 108 is capable of determining when wireless activity is above a threshold, using wireless activity data typically provided at least in part by the TAPs 102 that are at least in sentry mode. When the throttling engine 108 determines that wireless activity is above a threshold, the throttling engine 108 informs the TAP controller 106 that one or more of the TAPs 102 should be throttled up in power. Depending upon the implementation and/or embodiment, the TAPs engine 108 may or may not inform the TAP controller 106 when wireless activity is below a threshold. For example, the TAPs engine 108 may inform the TAP controller 106 that one of the TAPs 102 should be throttled up in power when a threshold is exceeded, and fail to inform the TAP controller 106 when the threshold is not exceeded. When the TAP controller 106 receives the throttle request from the throttling engine 108, the TAP controller 106 can throttle the relevant TAP up in power, which then stays at that power level for a predetermined period of time. If the TAP is not throttled again, then it can power down, enter sentry mode, drop to a low power mode, or step down gradually from a current power level after the predetermined period of time. Thus, there is no need for a throttle down in power command. In another embodiment, one or more of the TAPs 102 could be at a maximum radio power setting as a default, and receive throttle commands to throttle power down. In another embodiment, one or more of the TAPs 102 could remain in a given state until an throttle up or throttle down command causes the TAP to change, respectively, to a higher or lower state.

In the example of FIG. 1, stations 112, 114 can include a laptop, desktop computing device, portable digital assistant (PDA), wireless telephone, or any other applicable computing device capable of communications on a wireless network. The stations 112, 114 can comply with any wireless standard for the transmission of data, or may comply with none at all. The stations 112, 114 include a radio for transmission of data and may have any other known or convenient interface to a wireless network or other medium. Typically, the stations 112, 114 can transmit and receive data as RF signals using the radio or other interface.

In the example of FIG. 1, in operation, the TAPs 102 are assumed to initially be in a low power state. Since the TAPs 102 are at least in sentry mode, the TAP controller 106 can monitor the wireless domain through the TAPs 102, which provide wireless activity data to the TAP controller 106 and/or the throttling engine 108. For illustrative purposes, the station 112 is turned on or comes within range of the wireless domain, and is wirelessly coupled to the TAP 102-1. For illustrative purposes, it is assumed that the station 112 does not provide sufficient wireless activity to pass a wireless activity threshold. Therefore, the TAP 102-1 remains in a low power mode.

Later, additional stations (not shown) may be turned on or come within range of the wireless domain, but still not provide sufficient wireless activity to pass the wireless activity threshold. At some point, the station 114 is turned on or comes within range of the wireless domain, and the wireless activity at the TAP 102-1 passes the wireless activity threshold. The throttling engine 108 receives the wireless activity data, determines that the wireless activity threshold is exceeded (perhaps for a certain duration, depending upon the implementation and/or embodiment), and informs the TAP controller 106 that the TAP 102-1 is to be throttled up in power. The TAP controller 106 throttles up the TAP 102-1, the TAP 102-1 throttles up to a higher power state and remains at the higher power state for a period of time. At some point before or after the TAP 102-1 is throttled up, the station 114 is coupled to the TAP 102-1.

While the wireless activity exceeds the wireless activity threshold, the throttling engine 108 will continue to inform the TAP controller 106 that the TAP 102-1 is to be throttled up to the higher power state, the TAP controller 106 keeps the TAP 102-1 throttled up to the higher power state with a throttle command, and the TAP 102-1 remains at the higher power state for a period of time.

Later, additional stations (not shown) may be turned on or come within range of the wireless domain, and the throttling engine 108 causes the TAP 102-1 to eventually throttle up to a maximum radio power. The TAP 102-1 can perhaps continue to handle traffic as even more stations (not shown) are turned on or come within range. At some point, the throttling engine 108 determines, with the addition of the wireless station 116, that the TAP 102-1 cannot handle all of the wireless traffic near it, and sends a throttle command to the TAP 102-2, which, for illustrative purposes, is assumed to overlap with the TAP 102-1 over at least a portion of the wireless domain. The station 116 (or perhaps some other station) may or may not be handed off by the TAP 102-1 to the TAP 102-2.

When the wireless activity drops below the wireless activity threshold, the throttling engine 108 stops informing the TAP controller 106 of the need for throttling up, and after a period of time is up the TAP 102-1 throttles down. At some point, when wireless traffic reaches a low point or stops entirely, the TAP 102-1 drops to the low power state once more.

Figure 2:
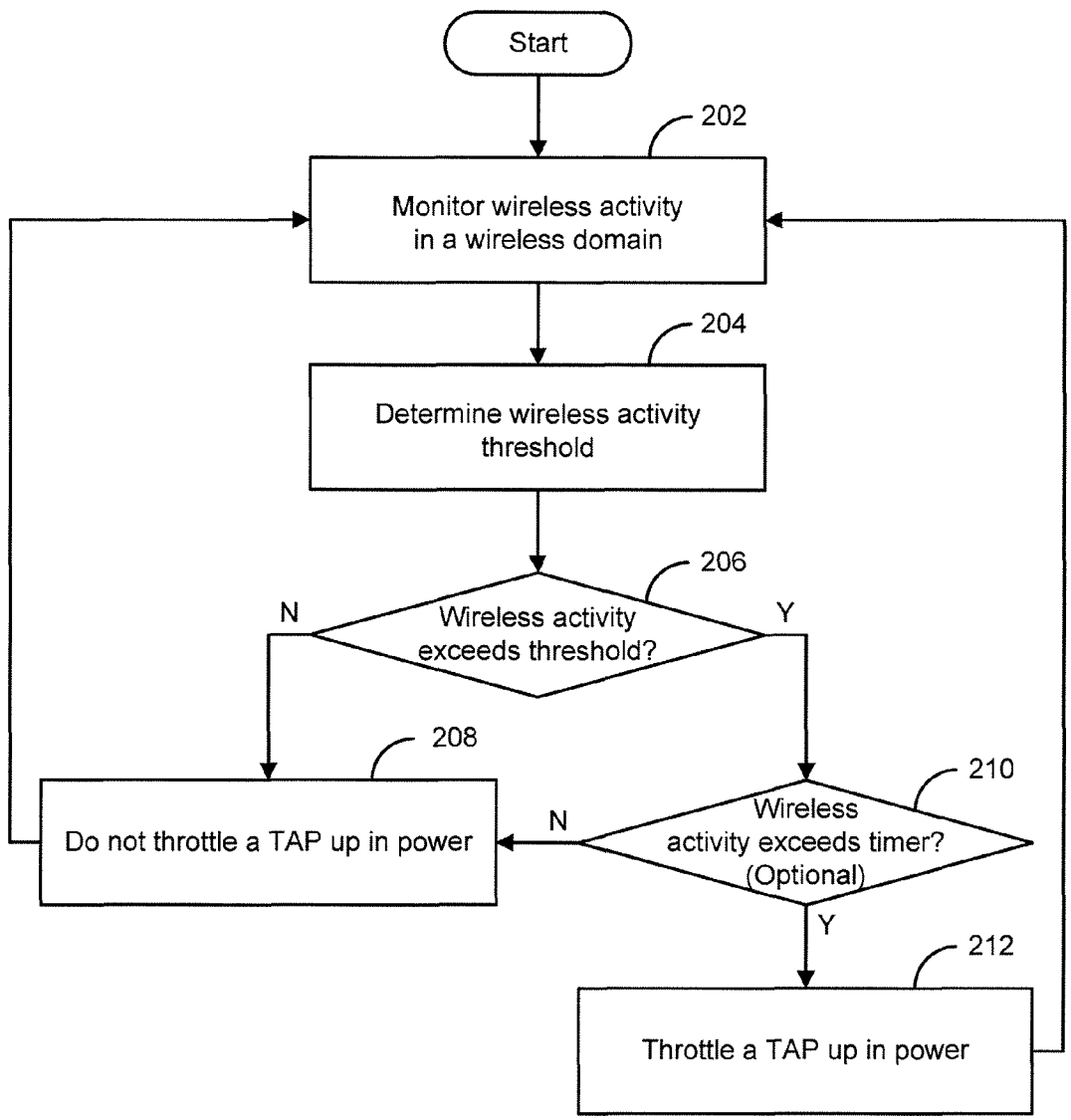
FIG. 2 depicts a flowchart of an example of a method for throttling a throttleable access point (TAP).

FIG. 2 depicts a flowchart 200 of an example of a method for throttling a TAP. The method is organized as a sequence of modules in the flowchart 200. However, it should be understood that these and other modules associated with other methods described herein may be reordered for parallel execution or into different sequences of modules.

In the example of FIG. 2, the flowchart 200 starts at module 202 where wireless activity in a wireless domain is monitored. Wireless activity is typically, though not necessarily or only, detected when RF transmissions from one or more stations are received at an AP, such as a TAP that is at least in sentry mode, of the wireless domain. The APs send wireless activity data to a controller and/or throttling engine for analysis. The wireless activity data may or may not be pre-processed at the AP, depending upon the implementation and/or embodiment. The wireless activity data at least can provide information about the amount of wireless activity in the wireless domain, and the controller or some other engine knows about the capabilities of the APs of the wireless domain in handling the load. So a comparison of the capabilities of the APs and the wireless activity can indicate whether the capabilities of the APs are being pushed beyond an acceptable threshold.

In the example of FIG. 2, the flowchart 200 continues to module 204 where a wireless activity threshold is determined. The wireless activity threshold can be set by a human (e.g., systems administrator) or software agent. The threshold can be based upon an estimated amount of wireless activity, the ratio of non-AP stations to APs, or other parameters. The key with respect to setting the wireless activity threshold is to ensure, as much as is possible, that APs can be throttled up in power when the wireless traffic reaches a point (and perhaps remains at or above that point for a period of time) where a decision-maker has determined that the APs cannot handle the wireless traffic adequately. Whether the APs can handle the wireless traffic adequately may be based on measurements, empirical or historical data, QoS considerations, or even opinion.

In a static threshold implementation, the wireless activity threshold is static in that it does not vary in response to the wireless activity data obtained through the APs of the wireless domain. In this simple implementation, determining the wireless activity threshold involves reading a threshold value from memory for comparison with current estimated wireless activity. If there are multiple power levels for a TAP, then the TAP can be associated with a respective multiple static wireless activity thresholds. (It may be noted that the number of wireless activity thresholds can equal the number of power levels plus one if the lowest power level does not have an associated wireless activity threshold.) If there are multiple TAPs, then each of the TAPs can be throttled at the same or different static wireless activity thresholds.

In a dynamic threshold implementation, the wireless activity threshold is dynamic in that it varies in response to the wireless activity data obtained through the APs of the wireless domain. For example, if wireless activity is fluctuating rapidly over time, it may be desirable to change the threshold. This may cause a TAP to be less susceptible to throttling down when wireless activity dips, which might be considered desirable because of anticipated increases in wireless activity in the short term; or may cause the TAP to be less susceptible to throttling up when wireless activity increases, which might be considered desirable if it is predicted that the wireless domain can handle a momentary increase in activity. Dynamic thresholds can be set using historical wireless activity data, including both recent history, and long-term history. An example of long-term history might include increases in wireless activity at certain days during the week (e.g., Monday to Friday) at certain times (e.g., 8 A.M., perhaps when many people enter the wireless domain at the start of work). Dynamic thresholds can also be implicitly set in some cases. For example, if a station informs, either implicitly or explicitly, of a need to use relatively high amounts of bandwidth (e.g., for a large file download), dynamic thresholds could be dynamically dropped near the station in anticipation of the increased activity. In some implementations, TAP throttling can be accomplished relatively rapidly, which reduces the need for dynamic thresholds. In other cases, TAPs might be relatively slow in throttling up, making dynamic thresholds more valuable to enable anticipation of wireless resource needs.

In a first threshold example, each TAP has its own one or more wireless activity thresholds. When an individual TAP reaches one of its thresholds, it is throttled up in power. TAPs throughout the wireless domain may have the same values for each of their one or more thresholds, or different TAPs could have different thresholds. The TAPs in this first threshold example are greedy in the sense that they throttle up in response to activity around themselves, without consideration of the needs of the wireless domain. This can be advantageous because it is simple, and greedy throttling of power at least addresses the issue of a TAP-local need for increased power.

In a second threshold example, a first TAP can influence the throttling of a second TAP. For example, reaching a wireless activity threshold at a first TAP causes the first TAP and a second TAP to throttle up in power. Alternatively, reaching a first wireless activity threshold for a first TAP causes the first TAP to be throttled up in power and reaching a second wireless activity threshold for the first TAP causes both the first TAP and a second TAP (or perhaps only the second TAP) to be throttled up in power. At least the first TAP in this second threshold example is collaborative in the sense that it (or a controller higher up the chain) tells a second TAP to throttle up in response to wireless activity near the first TAP.

As a variation on the second threshold example, say a first TAP and a second TAP have overlapping coverage of at least a portion of a wireless domain. When the first TAP reaches one of its thresholds, both the first TAP and the second TAP (and perhaps all other TAPs that have overlapping coverage with respect to the first TAP) are throttled up in power. This could also be accomplished for "greedy" TAPs where the first TAP and the second TAP reach their respective thresholds and throttle up in response to increased wireless activity, without any collaboration between the first TAP and the second TAP.

As a third threshold example, a first TAP and a second TAP may have overlapping coverage. If wireless activity at both the first TAP and the second TAP increases sufficiently to make throttling up desirable, the first TAP may throttle up and inform the second TAP that throttling up is not necessary. In this way, in response to increased wireless activity, only one of the TAPs throttles up in power to see if it can handle the increased wireless load. It may be considered desirable to throttle the first TAP up to maximum before throttling up any redundant TAPs. Or it may be considered desirable to gradually throttle up overlapping TAPs, rather than to favor running particular ones of the TAPs at higher power.

In a fourth threshold example, each TAP in the wireless domain could be throttled up in power when wireless activity in a wireless domain reaches one or more global wireless activity threshold. The one or more global wireless activity thresholds can be considered global with respect to the wireless domain because it does not take into account wireless activity in different areas of the wireless domain. As the size of the wireless domain increases, the desirability of more local wireless activity thresholds increases because wireless activity may be high in one corner of the wireless domain, but low in another corner of the wireless domain; so throttling up power when wireless activity exceeds a global wireless activity threshold will not help if a TAP is throttled up in power in a low activity corner of the wireless domain. A more local solution may be to have wireless activity thresholds for "bunches" of TAPs, presumably located relatively near one another.

In a first local wireless activity threshold example, a plurality of APs have wireless activity thresholds associated with them, and when a wireless activity threshold is exceeded within range of an AP, TAPs near the AP (and the AP, if it is a TAP) are throttled up in power. Each AP can have multiple wireless activity thresholds, and as each wireless activity threshold is exceeded, the TAPs are throttled up in power a bit more.

In a second local wireless activity threshold example, a plurality of APs have wireless activity thresholds associated with them, and when a wireless activity threshold is exceeded within range of an AP, a TAP near the AP (or the AP, if it is a TAP) is throttled up in power. The TAP can also have a wireless activity threshold associated with it, and when the wireless activity threshold is exceeded, another TAP is throttled up in power, which may or may not also have a wireless activity threshold associated with it. In these local wireless activity threshold examples, each wireless activity threshold can be thought of as local with respect to an AP because the wireless activity near the AP is taken into consideration when determining whether the wireless activity threshold is exceeded.

More sophisticated implementations may include setting "floating" thresholds that vary depending upon the quantity, nature, and/or location of wireless activity within the wireless domain. As used herein, a wireless activity threshold that depends upon local wireless activity, but is not statically associated with a particular AP, is referred to as a "floating" wireless activity threshold, as opposed to an AP-specific wireless activity threshold, where it is desirable to draw a distinction between the two. A floating wireless activity threshold may be adjusted dynamically in response to the wireless activity data received while monitoring wireless activity. Depending upon the implementation, embodiment, configuration, and/or wireless activity data, determining a wireless activity threshold can dynamically increase or decrease in complexity depending upon conditions within the wireless domain. As used here, "dynamically" means "in response to changing conditions within the wireless domain." In these more sophisticated implementations, each wireless activity threshold can be thought of as local with respect to a potentially changing subset of APs in the wireless domain. For example, if wireless activity near a first subset of APs causes a first TAP to be throttled up in power, it may be that a second overlapping subset of APs no longer "needs" a second TAP at its current power; the subset of APs associated with the dynamic wireless activity threshold changes over time. In this example, picture a wave of wireless activity that sweeps through a wireless domain, throttling TAPs up in power for a subset of APs on the crest of the wave, and throttling TAPs down in power (or not throttling up) TAPs as the wave passes.

In the example of FIG. 2, the flowchart 200 continues to decision point 206 where it is determined whether wireless activity exceeds a wireless activity threshold. The wireless activity threshold can be global, relatively local, local, AP-specific, or floating, depending upon the implementation and/or embodiment. Depending upon the implementation and/or embodiment, the wireless activity threshold can be exceeded if RF energy exceeds a certain amount, the number of non-AP stations to APs exceeds a certain ratio, traffic-specific (e.g., QoS) conditions are desired, and/or some other condition is desired.

If it is determined that the wireless activity threshold is not exceeded (206-N), then the flowchart 200 continues to module 208 where a TAP is not throttled up in power. In a first implementation, "not throttling the TAP up in power" requires no action, and the TAP will presumably throttle down over time without instructions. In a second implementation, each TAP has a setting, and "not throttling the TAP up in power" may also include lowering the setting so as to throttle the TAP down in power, if the wireless activity drops below a second wireless activity threshold (where the wireless activity threshold of decision point 206 is a first wireless activity threshold). In either case, the flowchart 200 returns to module 202 and continues as described previously.

If, on the other hand, it is determined that the wireless activity threshold is exceeded (206-Y), then the flowchart 200 continues to optional decision point 210 where it is determined whether a duration of wireless activity exceeds a timer threshold. The timer threshold can be inherently or explicitly set to zero, which means that the determination is always "yes." However, since TAPs can take time to throttle up in power, brief spikes in wireless activity might cause a TAP to throttle power up and down more frequently than is desirable. To prevent TAPs from powering up and down too frequently, a timer can be set. When the duration of wireless activity exceeds the duration of the timer, the timer threshold is exceeded.

It should be noted that TAPs can be capable of throttling power relatively rapidly, which may reduce or eliminate the need for a timer. For at least this reason, the decision point 210 is optional, and whenever the wireless activity exceeds the threshold, the flowchart 200 proceeds directly to module 212 (described below). Whether removing the timer is desirable can depend upon the capabilities of the TAP, the particular implementation, the opinions of the humans managing the wireless domain, or other factors.

If it is determined that the duration of wireless activity does not exceed a timer threshold (210-N), then the flowchart 200 returns to module 208 and continues as described previously. It may be noted that if the optional decision point 210 is not used in an implementation, then 210-N will not exist for the implementation.

If, on the other hand, it is determined that the duration of wireless activity exceeds a timer threshold (210-Y), then the flowchart 200 continues to module 212 where a TAP is throttled up in power. The TAP can be throttled up in power in many ways. For example, power can be applied to the TAP, a group of inactive components can be activated, instructions can be transmitted to the TAP to cause the TAP to resume normal operation, or another known or convenient throttling scheme can be applied. In a first implementation, the TAP remains throttled up for a period of time that is greater than the time it takes to traverse the flowchart 200 back to decision point 206. This ensures that the TAP will not power down while wireless activity remains above the wireless activity threshold, but before receiving subsequent agitation. This time period can also cause the TAP to remain powered up for some period of time after wireless activity drops below the wireless activity threshold, which can ensure that the TAP remains powered up during a brief drop in wireless activity. In a second implementation, the TAP remains powered up until throttled down. In any case, the flowchart 200 returns to module 202 and continues as described previously.

Figure 3:
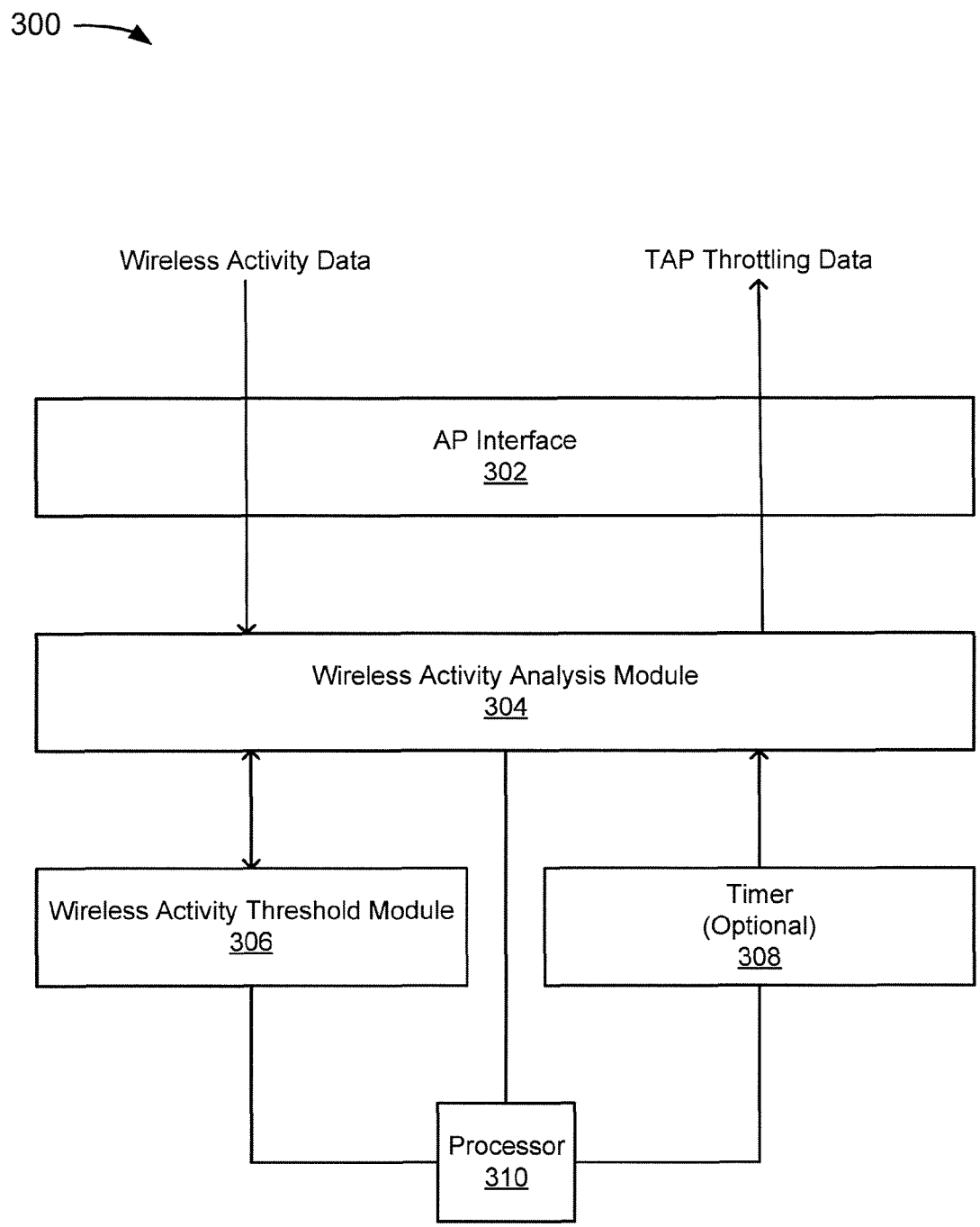
FIG. 3 depicts an example of a throttling engine.

FIG. 3 depicts an example of a wireless domain power saving engine 300. The wireless domain power saving engine 300 can include a controller or a portion of a controller, a controller can include the wireless domain power saving engine 300 or a portion of the wireless domain power saving engine 300, or a controller and the wireless domain power saving engine 300 can be distinct with respect to one another. The system 300 includes an AP interface 302, a wireless activity analysis module 304, a wireless activity threshold module 306, an optional timer 308, and a processor 310. The processor 310 is coupled to the wireless activity analysis module 304, the wireless activity threshold module 306, and the optional timer 308.

In the example of FIG. 3, the AP interface 302, receives wireless activity data from controllers, stations, and/or other devices or engines associated with a wireless domain, or, more generally, a communications network. The AP interface 302 can interpret the wireless activity data in terms of a number, ratio, or other known or convenient value. For example, the wireless activity data can include a number associated with the number of wireless packets received at an AP and/or sent from the AP, the ratio of non-AP stations to APs in a wireless domain or a portion of the wireless domain, etc. The wireless activity data can be in a general format that is similar to that provided from the APs of the wireless domain, or data from the APs can be preprocessed or compiled at, by way of example but not limitation, a controller or some other intermediate device.

In the example of FIG. 3, the wireless activity analysis module 304 receives the wireless activity data from the AP interface 302. A module, as used in this paper, can include hardware, firmware, or software implemented in hardware or firmware for execution by a processor. The wireless activity analysis module 304, together with the processor 310, can be referred to as a wireless activity analysis engine. The wireless activity analysis module 304 can receive a wireless activity threshold value from the wireless activity threshold module 306 and a timer threshold from the optional timer 308. In operation, the wireless activity analysis engine compares the wireless activity data to the wireless activity threshold, determines whether the wireless activity threshold has been exceeded and, if applicable, whether the wireless activity threshold has been exceeded for a requisite amount of time (i.e., the timer threshold has been exceeded). If the wireless activity threshold has been exceeded for the requisite amount of time, the wireless activity analysis engine sends TAP throttling data through the AP interface 302. The TAP throttling data can be sent directly to a TAP, causing the TAP to throttle itself up in power, or the TAP throttling data can be sent to an intermediate device, such as a controller, which can use the TAP throttling data to determine which TAPs to throttle, if any. A partially disabled TAP may be able to "self-start" when given a throttling instruction, and a completely powered-down TAP may receive power instead of or in addition to a throttling instruction. In an alternative embodiment, the wireless activity analysis engine sends TAP throttling data as a report, regardless of whether TAP throttling is called for.

In the example of FIG. 3, the wireless activity threshold module 306 provides a wireless activity threshold to the wireless activity analysis module 304. The wireless activity threshold module 306, together with the processor 310, can be referred to as a wireless activity threshold engine. An initial wireless activity threshold value can be input by a human or software agent. The value represents an amount of wireless activity within a wireless domain or a portion of the wireless domain at which it is desirable (according to the agent or by default) to throttle a TAP up in power to handle some of the load. Depending upon the implementation and/or embodiment, the wireless activity threshold module 306 may or may not receive feedback from the wireless activity analysis module 304 that enables the wireless activity threshold module 306 to dynamically alter threshold values based upon wireless activity within a wireless domain or a portion of the wireless domain.

In the example of FIG. 3, the optional timer 308 provides a timer threshold to the wireless activity analysis module 304. The timer threshold may be represented, at least conceptually, as a number value. The optional timer 308 can also provide a first timestamp at a time when the wireless activity analysis engine determines that a wireless activity threshold has been exceeded, and a second timestamp at a later time. The timer threshold is exceeded when the difference between a first timestamp and a second timestamp is greater than the number value of the timer threshold. As used here, a timestamp is intended to include any value associated with a timer such that the wireless activity analysis module 304 can compare a first timestamp to a second timestamp to determine, or at least approximate, an amount of time has elapsed between receiving the first timestamp and the second timestamp. The exact nature or implementation of the timer 308 is not critical. The timer 308 is optional because, depending upon the implementation, throttling may occur on an as-needed bases rather than on a delayed basis to reduce the likelihood of wasteful fluctuations in power levels of TAPs.

In the example of FIG. 3, in operation, wireless activity data is provided from the AP interface 302, a wireless activity threshold is provided from the wireless activity threshold module 306, and a timer threshold and timestamp is provided from the optional timer 308 to the wireless activity analysis module 304. The wireless activity analysis module 304 determines whether estimated wireless activity (derived at least in part from the wireless activity data) exceeds the wireless activity threshold, and has exceeded the wireless activity threshold for a duration that exceeds the timer threshold. When the wireless activity threshold and the timer threshold (if applicable) are both exceeded, and depending upon the implementation even when not exceeded, the wireless activity analysis engine sends TAP throttling data through the AP interface 302. As previously indicated, the AP interface 302 can include a direct link to an AP, or an indirect link (e.g., through a controller).

Figure 4:
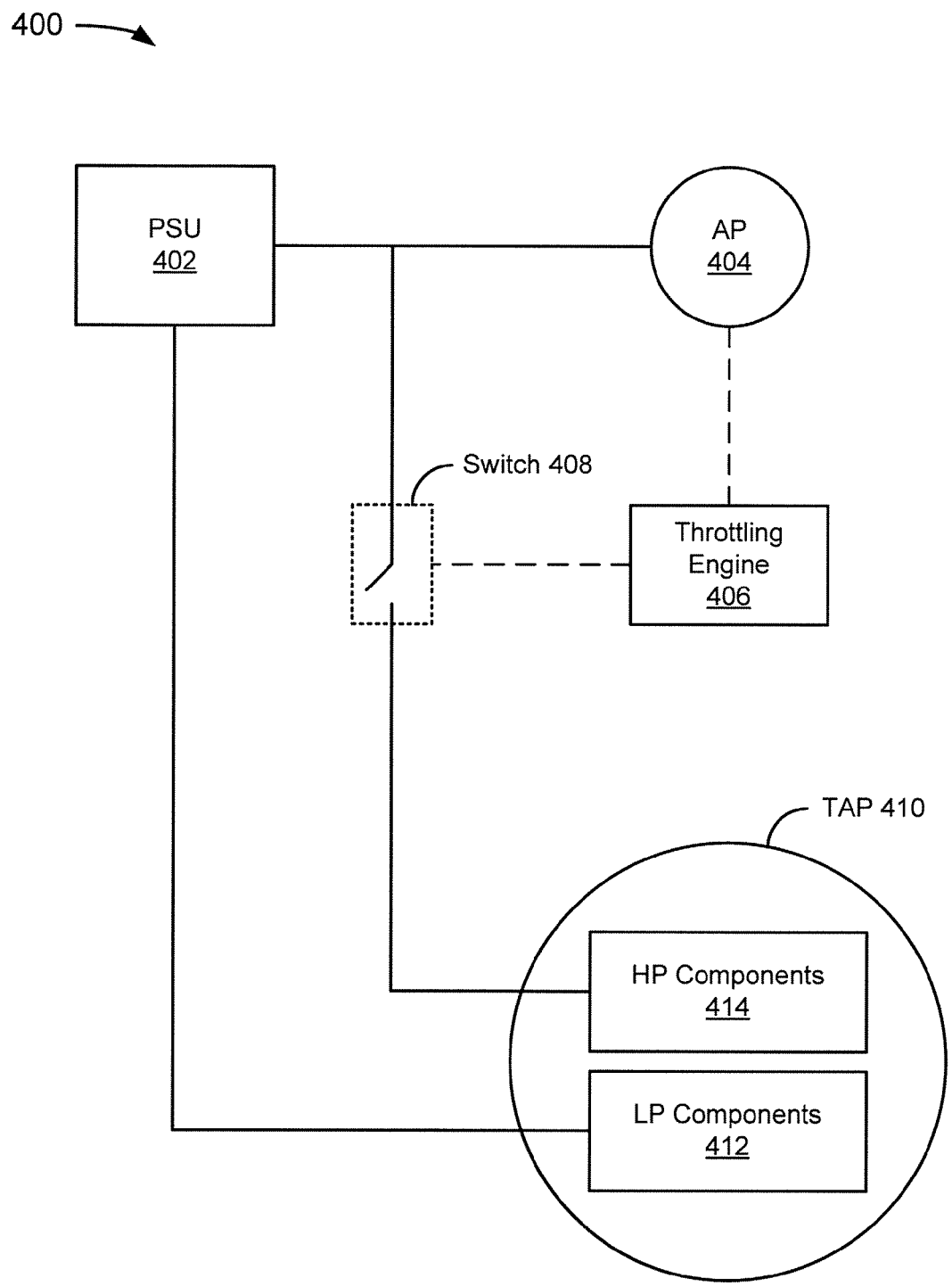
FIG. 4 depicts a system for providing power to APs in a power-saving wireless domain.

FIG. 4 depicts a system 400 for providing power to APs in a power-saving wireless domain. The system 400 includes a power supply unit (PSU) 402, an AP 404, a throttling engine 406, a switch 408, and a TAP 410. For illustrative simplicity, only one each of an AP and TAP are depicted, but, depending upon the implementation, there can be multiple APs or TAPs in a wireless domain. The TAP 410 includes optional low power (LP) components 412 and high power (HP) components 414.

In the example of FIG. 4, the PSU 402 can be any known or convenient power source. Although in the example of FIG. 4, the PSU 402 appears to be external with respect to the APs, the PSU 402 can be implemented as batteries within one or more of the APs, and hence "distributed" within each of the APs. Also, the PSU 402 could be implemented as multiple power sources or provide power over Ethernet (PoE).

In the example of FIG. 4, the AP 404 is operationally connected to the PSU 402. This is intended to show that the AP 404 receives constant power and is, therefore, continuously powered up. Because it always has power, the AP 404 can be configured for continuous monitoring of the wireless domain, if desired.

In the example of FIG. 4, the throttling engine 406 can be implemented as described with reference to FIG. 3, or using other techniques described in this paper.

In the example of FIG. 4, the switch 408 is coupled to the throttling engine 406. In this example, the switch 408 is closed (i.e., on) when the throttling engine 406 provides TAP throttling data indicating that the TAP 410 is to be throttled up in power. In this example, the switch 408 is open (i.e., off) when the throttling engine 406 does not provide TAP throttling data indicating that the TAP 410 is to be throttled up in power. The switch 408 is intended to be a conceptual representation of when power is provided to the HP components 414 of the TAP 410, not an actual hardware switch or transistor, though it could be implemented as such; the switch 408 can be a "logical" switch.

In the example of FIG. 4, the TAP 410 includes LP components 412 that are operationally connected to the PSU 402. Thus, the LP components 412 are always on. The LP components 412 might include, by way of example but not limitation, components that consume relatively little power, a radio receiver, a single antenna capable of sending and receiving RF signals, or some other component. In an AP, the radio often consumes the most power; so if the LP components 412 include everything except the radio, the TAP 410 can conserve significant power in sleep mode. Although it consumes power, it might be desirable to make the radio receiver (but not transmitter) one of the LP components 412 to ensure that the TAP 410 can listen for wireless activity. If the radio receiver is one of the LP components 412, then the TAP 410 may be able to enter a "sentry mode" and help monitor the wireless domain. Finally, although it consumes even more power, it might be desirable to make one of the LP components 412 an antenna capable of sending and receiving in a first spatial stream. In this way, the TAP 410 always has full AP functionality. For example, an 802.11-n-compliant TAP 410 might include a single antenna in the LP components 412, which would give the TAP 410 full AP functionality in a low power mode, but not full 802.11n AP functionality (with multiple spatial streams).

The HP components 414, on the other hand, receive power from the PSU 402 through the switch 408. Thus, the HP components 414 are only on when the switch 408 is closed. The HP components 414 might include, by way of example but not limitation, a radio transmitter, a radio receiver, multiple antennae, or any other component. An 802.11-n-compliant TAP 410 might include one or more antennae in the HP components 414, which would give the TAP 410 the ability to use multiple spatial streams in a high power mode. In a typical implementation, this can also cause a processor on the TAP 410 to consume more power due to an increased computational load.

The example of FIG. 4 is intended to illustrate a simple, conceptual example. More complex TAPs may have multiple power levels, such as maximum power, high power, low power, sentry (e.g., transmitters off), standby (e.g., radios off), and sleep (e.g., powered down). The number of discrete power levels is implementation-specific, but can easily range from a few to tens, hundreds, or even more.

In the example of FIG. 4, in operation, the AP 404 and the LP components 412 of the TAP 410 receive power from the PSU 402. The TAP 410 is, for illustrative purposes, assumed to be in a low power mode (with a single antenna operational for sending and receiving), which for this example means that the switch 408 is open and the HP components 414 are disabled. The AP 404 monitors nearby stations and provides wireless activity data to the throttling engine 406. The throttling engine 406 determines that the wireless activity has passed a wireless activity threshold and, if applicable, a timer threshold. So the throttling engine 406 sends a command to the switch 408 to close the switch 408, thereby providing power from the PSU 402 to the HP components 414 of the TAP 410. Alternatively, the throttling engine 406 could provide an instruction to the AP 404, which then instructs the TAP 410 to enter HP mode. When the TAP 410 is powered up, it can perform any of the functions that the AP 404 can, assuming it is configured to do so. Later, when wireless activity dips below a wireless activity threshold, the throttling engine 406 may open the switch 408, causing the TAP 410 to drop back into LP mode.

It should be noted that the AP 404 and the TAP 410 could be incorporated as a single device, where the LP components 412 provide the same functionality as described above with reference to the AP 404. In such an implementation, the TAP 410 could be referred to as a self-throttling TAP.

Figure 5:
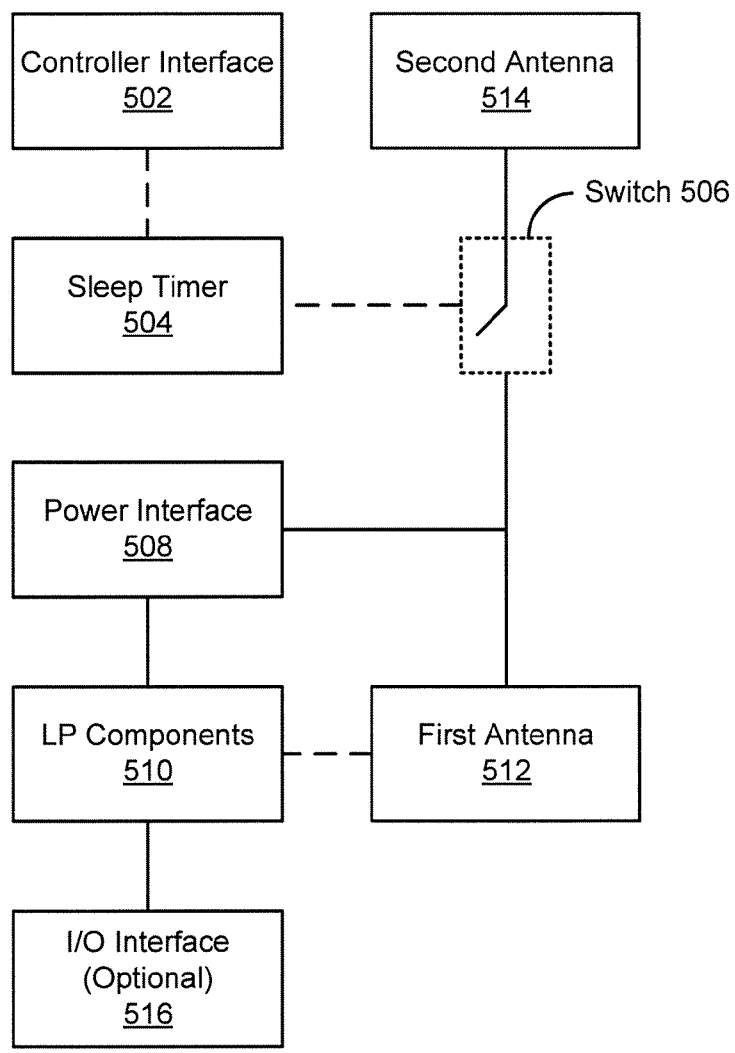
FIG. 5 depicts an example of a TAP.

FIG. 5 depicts an example of a TAP 500. The TAP 500 includes a controller interface 502, a sleep timer 504, a switch 506, a power interface 508, LP components 510, a first antenna 512, a second antenna 514, and an optional I/O interface 516.

In the example of FIG. 5, the controller interface 502 can be implemented, by way of example but not limitation, as an interface to a wired backbone to which a controller is coupled. The interface can be, by way of example but not limitation, an Ethernet interface. It would typically be undesirable to disable the controller interface 502 when the TAP 500 is asleep because it takes relatively little power to keep, for example, an Ethernet interface, enabled. However, in an implementation, the controller interface 502 could be powered down and the TAP 500 would presumably first receive power from the power interface 508, power up some low power components including the controller interface 502, and go from there.

In the example of FIG. 5, the sleep timer 504 can be implemented as a timer having a start time and an end time. The timer can be reset when the sleep timer 504 receives a wakeup command, and continues running from the start time to the end time. While the timer is running, the sleep timer 504 outputs a wakeup signal. When the timer reaches the end time, the sleep timer 504 ceases outputting the wakeup signal. It can be advantageous to use a pseudo random number generator to set the end time of the timer to prevent coincidental deactivation of multiple TAPs, each having the same timer duration; simultaneous deactivation of many TAPs could be undesirable. As a general rule, if the end time is set to a relatively high value, the TAP will consume relatively large amounts of power. On the other hand, if the end time is set to a relatively low value, the TAP is more likely to need to be throttled up in power prior to providing a desired level of service, which, at least potentially, can result in delay.

In the example of FIG. 5, the switch 506 is coupled to the sleep timer 504 and can be implemented as a hardware or logical switch in any applicable known or convenient manner. While the switch 506 receives the wakeup signal from the sleep timer 504, the switch 506 is closed (i.e., on). While the switch 506 is not receiving the wakeup signal from the sleep timer 504, the switch 506 is open (i.e., off).

In the example of FIG. 5, the power interface 508 can be implemented as an interface to a PSU (e.g., an external power source, a battery, or some other power source) in any applicable known or convenient manner. In certain implementations, the controller interface 502 and the power interface 508 can be thought of as a single interface. For example, a PoE system provides both power and data through an Ethernet interface.

In the example of FIG. 5, the power interface 508 couples power from a power source to the LP components 510. The LP components 510, in this example, include components of the TAP 500 that draw power, such as a processor, memory, etc., but excluding the second antenna 514.

In the example of FIG. 5, the power interface 508 also couples power from a power source to the first antenna 512. The LP components 510 are coupled to the first antenna 512; the coupling is represented in the example of FIG. 5 as a dashed line. The LP components 510 provide the first antenna 512 with whatever functionality is needed for the first antenna 512 to send and receive RF data a first spatial stream.

In the example of FIG. 5, the power interface 508 couples power from a power source to the second antenna 514 so long as the switch 506 is closed. In this way, the second antenna 514 draws power only when the sleep timer 504 is outputting a wakeup signal, and the second antenna 514 does not draw power (i.e., it is off) when the sleep timer 504 is not outputting a wakeup signal.

In the example of FIG. 5, the optional I/O interface 516 can be associated with a display (e.g., light emitting diodes (LEDs) or a liquid crystal display (LCD)) or input device (e.g., a power button or dial). A display can, for example, enable a user to see whether the TAP is asleep, in sentry mode, operating at low power, or operating at high power at a glance. An input device can, for example, enable a person to force the TAP to remain in a full power mode. The I/O interface 516 is optional because control of the AP could, in at least some implementations, be handled entirely through the controller interface 502 and/or the LP components 510.

Advantageously, a TAP implemented as described with reference to FIG. 5 causes the TAP to power up when a throttling engine determines that it should, and to remain powered up even if there is a brief period of less activity. Thus, the TAP will not power up and power down too often. What constitutes "too often" can depend upon the amount wireless activity, the type of wireless activity, and/or the opinion of an agent who can set the duration of the sleep timer.

Even in an implementation where power can be throttled up or down with relatively immediate results, the data provided about wireless activity is likely to be in discrete units. For example, the wireless activity data may come as payload in packets or frames. Thus, advantageously, the sleep timer can keep the TAP from dropping in power before an update regarding the wireless activity data is received.

Figure 6:
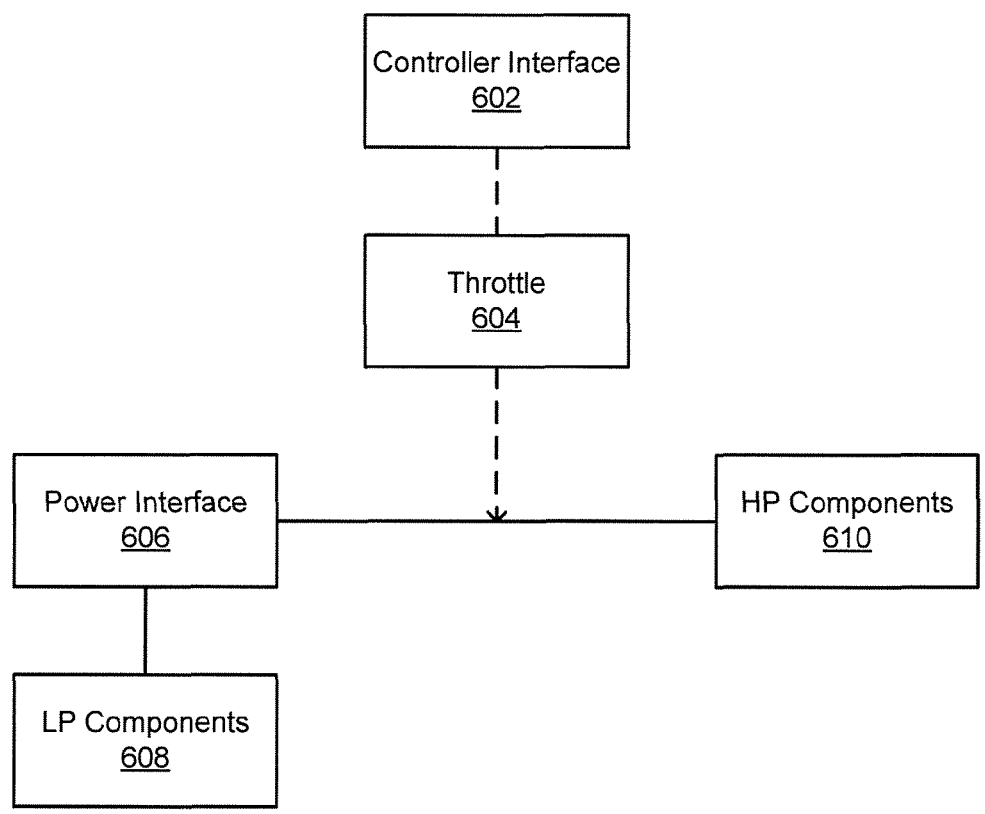
FIG. 6 depicts an example of a TAP.

FIG. 6 depicts an example of a TAP 600. The TAP 600 includes a controller interface 602, a throttle 604, a power interface 606, LP components 608, and HP components 610. FIG. 6 is intended to illustrate an example of a device with no sleep timer.

The controller interface 602 receives wireless activity data or TAP throttling data from a controller. The throttle 604 throttles (up or down) the power from the power interface 606 to the HP components 610, while the LP components 608 are not throttled. It may be noted, depending upon which components are characterized as LP, that increased power to the HP components 610 may increase power consumption by the LP components 608. For example, if the HP components include an additional antenna that is activated with increased power from the power interface 606 (due to throttling up by the throttle 604), and the LP components include a processor, the processor may consume more power when processing data associated with multiple spatial streams necessitated by the activation of the additional antenna than it did for a single (or fewer) spatial streams.

Figure 7:
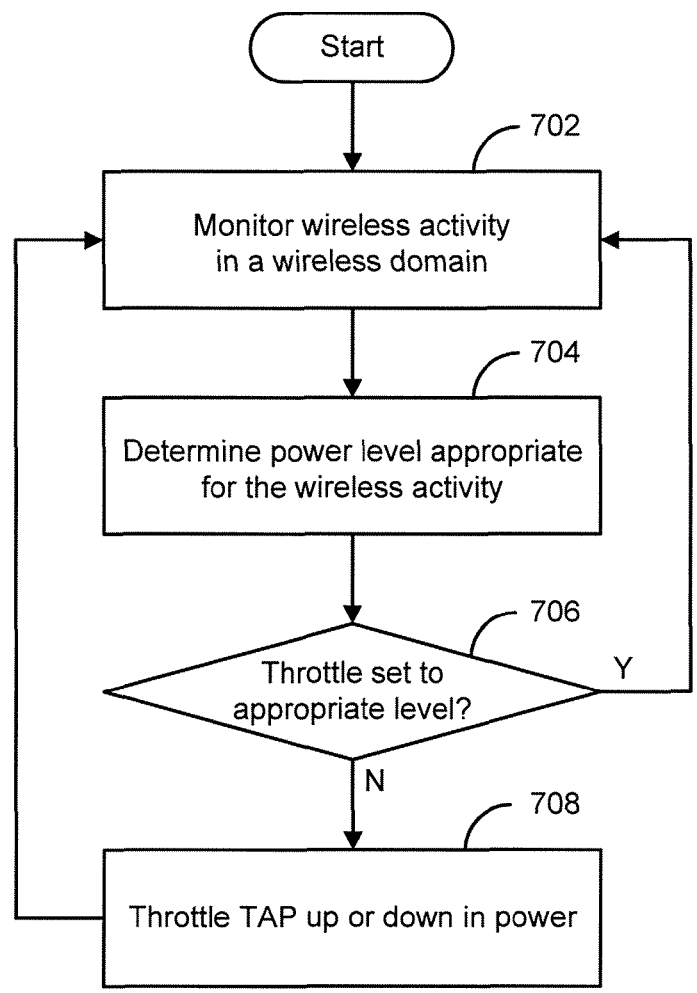
FIG. 7 depicts flowchart of an example of a method for throttling a TAP.

FIG. 7 depicts a flowchart 700 of an example of a method for throttling a TAP. The method is organized as a sequence of modules in the flowchart 700. However, it should be understood that these and other modules associated with other methods described herein may be reordered for parallel execution or into different sequences of modules.

In the example of FIG. 7, the flowchart 700 starts at module 702 where wireless activity in a wireless domain is monitored. Wireless activity is typically, though not necessarily or only, detected when RF transmissions from one or more stations are received at an AP, such as a TAP that is at least in sentry mode, of the wireless domain. The APs send wireless activity data to a controller and/or throttling engine for analysis. The wireless activity data may or may not be pre-processed at the AP, depending upon the implementation and/or embodiment. The wireless activity data at least can provide information about the amount of wireless activity in the wireless domain, and the controller or some other engine knows about the capabilities of the APs of the wireless domain in handling the load. So a comparison of the capabilities of the APs and the wireless activity can indicate whether the capabilities of the APs are being pushed beyond an acceptable threshold.

In the example of FIG. 7, the flowchart 700 continues to module 704 where a power level appropriate for the wireless activity is determined. The determination can be by a human for static determinations, or by a software agent for static or dynamic determinations. The "appropriate power level" can be referred to as a desired throttle setting, since any particular throttle setting can be at least roughly associated with a power level, and a desired throttle setting is one that is at least roughly associated with an appropriate power level. The desired throttle setting can be based upon an estimated amount of wireless activity, the ratio of non-AP stations to APs, or other parameters. The key with respect to setting the throttle is to ensure, as much as is possible, that the power provided to a TAP (or the HP components of a TAP) will result in adequate wireless domain performance, as defined by the human and/or software agents that manage the wireless domain. Whether the APs can handle the wireless traffic adequately may be based on measurements, empirical or historical data, QoS considerations, or even opinion.

In a static throttle settings implementation, a desired throttle setting will be the same for a particular amount of wireless activity estimated from wireless activity data obtained through the APs of the wireless domain. In this simple implementation, determining the desired throttle setting involves deriving the setting by comparing the current estimated wireless activity to a range of values, which may be calculated using a formula, chosen from a data structure stored in memory, or acquired in some other manner. If there are multiple power levels for a TAP, then the TAP can be associated with a respective multiple static throttle settings. If there are multiple TAPs, then each of the TAPs can be throttled at the same or different levels of estimated wireless activity, and each TAP may or may not have different throttle setting granularity and/or range.

In a dynamic throttle settings implementation, the throttle settings are dynamic in that they vary in response to the wireless activity data obtained through the APs of the wireless domain. For example, if a wireless domain in an office is intended to have higher performance in the daytime, and more power savings at night, it may be desirable to associate higher throttle settings for daytime estimated wireless activity and associate lower throttle settings for nighttime estimated wireless activity. Dynamic throttle settings can be set using historical wireless activity data, including both recent history, and long-term history. An example of long-term history might include increases in wireless activity at certain days during the week (e.g., Monday to Friday) at certain times (e.g., 8 A.M., perhaps when many people enter the wireless domain at the start of work). Dynamic throttle settings can also be implicitly set in some cases. For example, if a station informs, either implicitly or explicitly, of a need to use relatively high amounts of bandwidth (e.g., for a large file download), throttle settings could be dynamically dropped relative to estimated wireless activity near the station in anticipation of the increased activity. In some implementations, TAP throttling can be accomplished relatively rapidly, which reduces the need for dynamic throttle settings. In other cases, TAPs might be relatively slow in throttling up, making dynamic throttle settings perhaps more valuable to enable anticipation of wireless resource needs.

In any case, the power level appropriate for the estimated wireless activity is determined at a TAP. As various examples were provided above with reference to FIG. 2, it is assumed, in order to avoid redundancy, that the TAP operates on a greedy principal in that it determines an appropriate power level based solely upon the estimated wireless activity near the TAP.

In the example of FIG. 7, the flowchart 700 continues to decision point 706 where it is determined whether a throttle is set to an appropriate level. Since the estimated wireless activity is known and the power level appropriate for the wireless activity is known, a comparison of a current throttle setting with the desired throttle setting to achieve the desired power level will determine whether the throttle setting should be adjusted. If it is determined that the throttle is set to an appropriate level (706-Y), then the flowchart 700 returns to module 702 and continues as described previously. If, on the other hand, it is determined that the throttle is not set to an appropriate level (706-N), then the flowchart continues to module 708 where the TAP is throttled up or down in power to the appropriate throttle setting, and the flowchart 700 returns to module 702 and continues as described previously.

Figure 8:
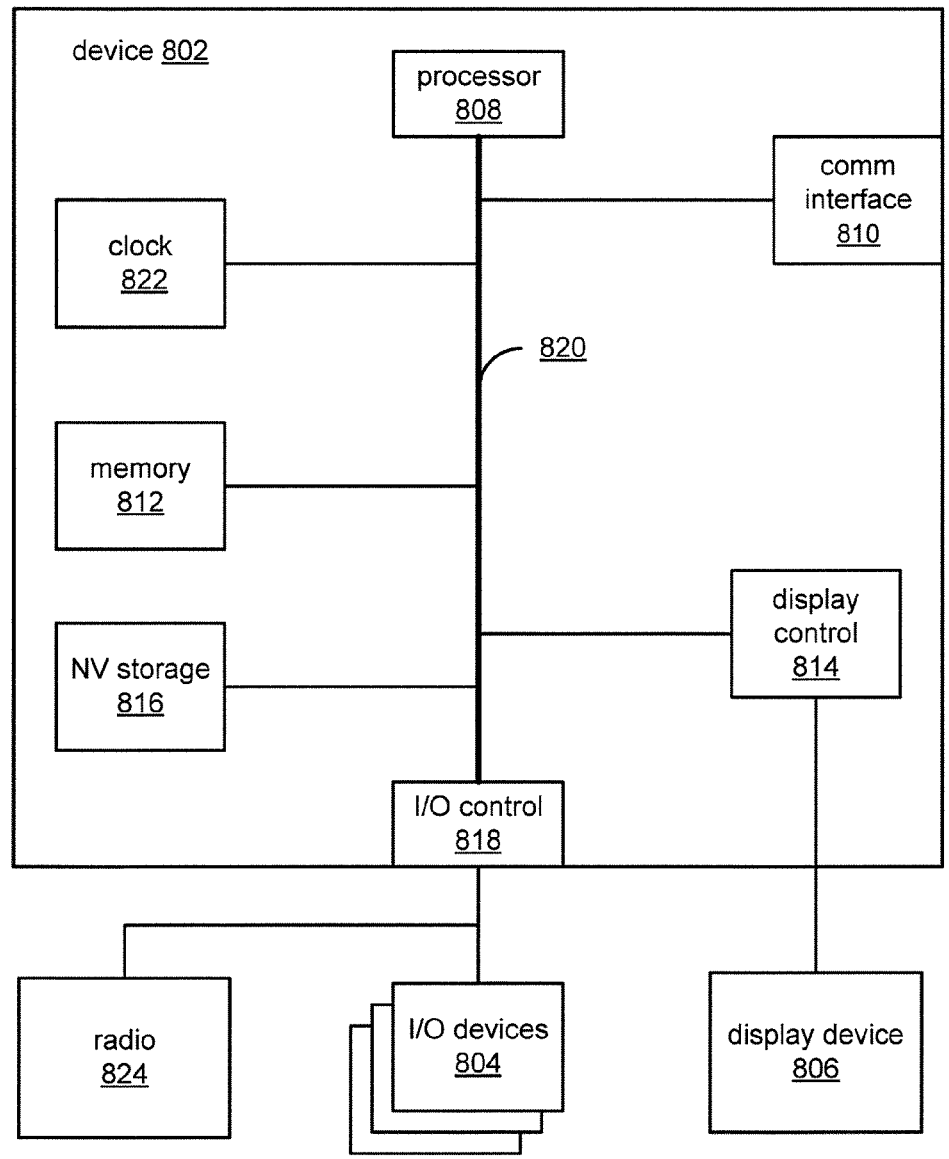
FIG. 8 depicts an example of a computing system that is representative of the computing systems discussed herein.

FIG. 8 depicts an example of a computing system 800 that is representative of the computing systems discussed herein. The system 800 may be a conventional computer system that can be used as a client computer system, such as a wireless client or a workstation, or a server computer system. The system 800 includes a device 802, I/O devices 804, and a display device 806. The device 802 includes a processor 808, a communications interface 810, memory 812, display controller 814, non-volatile storage 816, I/O controller 818, clock 822, and radio 824. The device 802 may be coupled to or include the I/O devices 804 and the display device 806.

The device 802 interfaces to external systems through the communications interface 810, which may include a modem or network interface. It will be appreciated that the communications interface 810 can be considered to be part of the system 800 or a part of the device 802. The communications interface 810 can be an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 808 may be, for example, a conventional microprocessor such as an Intel Pentium microprocessor or Motorola power PC microprocessor. The memory 812 is coupled to the processor 808 by a bus 820. The memory 812 can be Dynamic Random Access Memory (DRAM) and can also include Static RAM (SRAM). The bus 820 couples the processor 808 to the memory 812, also to the non-volatile storage 816, to the display controller 814, and to the I/O controller 818.

The I/O devices 804 can include a keyboard, disk drives, printers, a scanner, and other input and output devices, including a mouse or other pointing device. The display controller 814 may control in the conventional manner a display on the display device 806, which can be, for example, a cathode ray tube (CRT) or liquid crystal display (LCD). The display controller 814 and the I/O controller 818 can be implemented with conventional well known technology.

The non-volatile storage 816 is often a magnetic hard disk, flash memory, an optical disk, or another form of storage for large amounts of data. Some of this data is often written, by a direct memory access process, into memory 812 during execution of software in the device 802. One of skill in the art will immediately recognize that the terms "machine-readable medium" or "computer-readable medium" includes any type of storage device that is accessible by the processor 808.

Clock 822 can be any kind of oscillating circuit creating an electrical signal with a precise frequency. In a non-limiting example, clock 822 could be a crystal oscillator using the mechanical resonance of vibrating crystal to generate the electrical signal.

The radio 824 can include any combination of electronic components, for example, transistors, resistors and capacitors. The radio is operable to transmit and/or receive signals.

The system 800 is one example of many possible computer systems which have different architectures. For example, personal computers based on an Intel microprocessor often have multiple buses, one of which can be an I/O bus for the peripherals and one that directly connects the processor 808 and the memory 812 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 812 for execution by the processor 808. A Web TV system, which is known in the art, is also considered to be a computer system, but it may lack some of the features shown in FIG. 8, such as certain input or output devices. A typical computer system will usually include at least a processor, memory, and a bus coupling the memory to the processor.

In addition, the system 800 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 816 and causes the processor 808 to execute the various acts required by the operating system to input and output data and to store data in memory, including storing files on the non-volatile storage 816.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This Apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other Apparatus. Various general purpose systems may be used with programs in accordance with the teachings herein, or it may prove convenient to construct more specialized Apparatus to perform the required method steps. The required structure for a variety of these systems will appear from the description below. In addition, the present example is not described with reference to any particular programming language, and various examples may thus be implemented using a variety of programming languages.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of these teachings.

What is claimed is:

1. A method comprising:
   monitoring a wireless activity of a first access point coupled to a second access point, the first access point operating in a low power mode and the second access point operating in a sentry mode when the wireless activity of the first access point does not exceed a first threshold;
   if the wireless activity of the first access point exceeds the first threshold, (1) increasing a throttle setting of the first access point such that the first access point operates in a high power mode, and (2) maintaining a throttle setting of the second access point such that the second access point operates in the sentry mode; and
   if the wireless activity of the first access point exceeds a second threshold, higher than the first threshold, (1) increasing the throttle setting of the first access point such that the first access point operates in the high power mode, and (2) increasing the throttle setting of the second access point such that the second access point operates in a low power mode.

2. The method of claim 1, further comprising:
   monitoring a wireless domain including the first access point and the second access point to obtain wireless activity data;
   estimating the wireless activity of the first access point using the wireless activity data.

3. The method of claim 2, further comprising receiving at least a portion of the wireless activity data from the first access point.

4. The method of claim 2, further comprising receiving at least a portion of the wireless activity data from the second access point.

5. The method of claim 1, wherein a first antenna is active at the first access point when the first access point is operating in the low power mode, and a second antenna is active at the first access point when the first access point is operating in the high power mode.

6. The method of claim 1, further comprising supplying power over Ethernet (PoE) to the first access point.

7. The method of claim 1, further comprising using a single spatial stream when the first access point is in the low power mode and using multiple spatial streams when the first access point is in the high power mode.

8. The method of claim 1, further comprising spatially multiplexing multiple independent data streams, transferred at least approximately simultaneously within one spectral channel of bandwidth, when the first access point is in the high power mode.

9. The method of claim 1, further comprising at least approximately simultaneously transmitting over multiple non-overlapping channels when the first access point is in the high power mode.

10. The method of claim 1, further comprising operating the first access point in compliance with at least a portion of the IEEE 802.11n standard.

11. An apparatus, comprising:
    a throttle engine configured to be operatively coupled to (1) a first access point and (2) a second access point,
    the throttle engine configured to receive data indicative of the wireless activity of the first access point, the first access point operating in a low power mode and the second access point operating in a sentry mode when a wireless activity of the first access point does not exceed a first threshold;
    if the wireless activity of the first access point exceeds the first threshold, the throttle engine configured to (1) increase a throttle setting of the first access point such that the first access point operates in a high power mode, and (2) maintain a throttle setting of the second access point such that the second access point operates in the sentry mode,
    if the wireless activity of the first access point exceed a second threshold, higher than the first threshold, the throttle engine configured to (1) increase the throttle setting of the first access point such that the first access point operates in the high power mode, and (2) increase the throttle setting of the second access point such that the second access point operates in a low power mode.

12. The system of claim 11, the throttle engine configured to receive at least a portion of the data from the first access point.

13. The system of claim 11, wherein the throttle engine is configured to be coupled to a third access point, the third access point operating in a sentry mode when the second access point does not exceed a first threshold,
if the wireless activity of the second access point exceeds a first threshold for the second access point, the throttle engine configured to increase the throttle setting of the third access point such that the third access point operates in a low power mode.

14. The system of claim 11, wherein the throttle engine is configured to define a throttle command configured to cause the first access point to switch from the low power mode to the high power mode.

15. The system of claim 11, wherein the wireless activity data is associated with IEEE 802.11n communications.

* * * * *